A. E. SMITH.
Carriage Axle-Box.
No. 99,607. Patented Feb. 8, 1870.
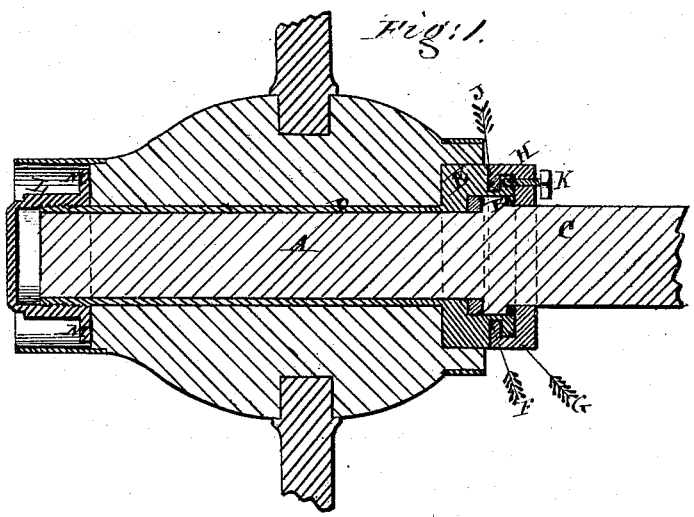
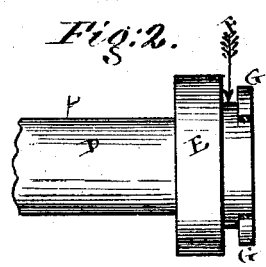
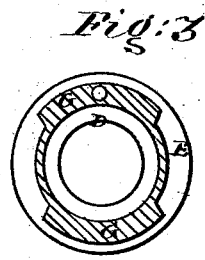
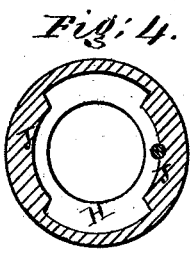
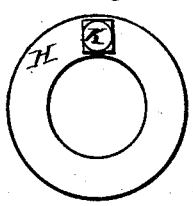
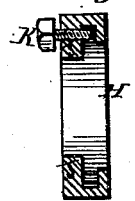

United States Patent Office.

ALFRED E. SMITH, OF BRONXVILLE, NEW YORK.

Letters Patent No. 99,607, dated February 8, 1870.

IMPROVEMENT IN CARRIAGE AXLE-BOXES.

The Schedule referred to in these Letters Patent and making part of the same.

*To all whom it may concern:*

Be it known that I, ALFRED E. SMITH, of Bronxville, Westchester county, and State of New York, have invented certain new and useful Improvements in Axle-Boxes, for securing wheels on axles; and I do hereby declare that the following is a full description of the same.

The nature of my invention consists in making the axle-box with a solid head, upon the face of which is cut an annular groove or channel, with one or more ledges, of metal, forming one side or wall of the groove, and combining therewith a cap, having on its inner circumference, ledges of metal, corresponding with the spaces between the ledges forming the side of the annular groove, so as to enter the same, and thus, by turning the cap either to the right or left, permanently lock the wheel and axle together. But to describe my invention more particularly, I will refer to the accompanying drawings, forming a part of this specification, the same letters of reference, wherever they occur, referring to like parts.

Figure 1 is a longitudinal cut-section of the axle and axle-box, shown as if secured in a hub.

Figures 2 and 3 represent a side and face view of the head of the axle-box.

Figures 4, 5, and 6, are back, and inside, and sectional views of the lock cap.

Letter A represents the spindle, having a collar, of metal, B, formed at its junction with the axle C, for the purpose of preventing the wheel from getting off the axle, when secured in the axle-box D. This box is made with a solid head, E, upon the face or back end of which is cut an annular groove or channel, F, with one or more ledges G, forming the outer wall of the channel or groove.

The object of this method of constructing the channel and ledges on the face of the axle-box is to admit of a cap, H, secured, on the axle C, to the inner side of the collar B, locking into the annular channel, and thus secure the wheel and axle together. This is effected by means of ledges, of metal, J, formed on the inner circumference of the cap H, which are made so as to enter the space or spaces between the ledges G, on the face of the axle-box, and then by turning the cap either to the right or left, in the annular groove or channel, so as to engage under the ledges G, lock the wheel and axle firmly together.

To prevent all possibility of the cap working out of the annular groove, a binding-screw, K, or any other well-known device for such purposes, may be used to prevent the accidental separation of the cap and axle-box.

To prevent the axle-box from drawing back or out of the hub, as sometimes happens, in consequence of the shrinkage of the wooden hub, the box is made to extend beyond the front end of the hub, so as to admit of a screw-nut, L, with a broad flange, M, being secured thereon. The object of this flange is to overlap the end of the hub, and thus prevent all possibility of the withdrawal of the box from the hub.

Another advantage from the lengthening of the axle-box is that of obtaining a longer spindle or bearing for the wheel to run on, and thus give great steadiness of motion to it, as well as greater strength.

Having now described my invention, I will proceed to set forth what I claim, and desire to secure by Letters Patent of the United States:

Forming the ledge or ledges G, and annular groove F, on the face or back of a solid-headed axle-box, D, in combination with the cap H, having on its inner circumference the ledge or ledges, of metal, J, for locking into the annular groove F, when combined with the cap-nut L, having a flange, M, or its equivalent, substantially as described, and for the purposes hereinbefore set forth.

ALFRED E. SMITH.

Witnesses:
HOLMAN J. HALE,
CHARLES L. BARRITT.